United States Patent
Meng et al.

(10) Patent No.: US 11,542,572 B2
(45) Date of Patent: Jan. 3, 2023

(54) CRYOGENIC WORKBENCH, CRYOGENIC LASER PEENING EXPERIMENT SYSTEM AND CONTROL METHOD THEREFOR

(71) Applicant: JIANGSU UNIVERSITY, Suzhou (CN)

(72) Inventors: Xiankai Meng, Jiangsu (CN); Jianzhong Zhou, Jiangsu (CN); Chun Su, Jiangsu (CN); Jie Sheng, Jiangsu (CN); Jiale Xu, Jiangsu (CN); Jing Li, Jiangsu (CN); Shu Huang, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 966 days.

(21) Appl. No.: 16/332,754

(22) PCT Filed: Sep. 21, 2016

(86) PCT No.: PCT/CN2016/099513
§ 371 (c)(1),
(2) Date: Mar. 12, 2019

(87) PCT Pub. No.: WO2018/049694
PCT Pub. Date: Mar. 22, 2018

(65) Prior Publication Data
US 2021/0277496 A1  Sep. 9, 2021

(30) Foreign Application Priority Data
Sep. 13, 2016  (CN) .......................... 201610823153.5

(51) Int. Cl.
*C21D 10/00* (2006.01)
*B23K 26/356* (2014.01)
(Continued)

(52) U.S. Cl.
CPC .......... *C21D 10/005* (2013.01); *B23K 26/356* (2015.10); *B23K 26/703* (2015.10);
(Continued)

(58) Field of Classification Search
CPC .. B23K 26/034; B23K 26/0622; B23K 26/12; B23K 26/356; B23K 26/703; C21D 10/005; C21D 11/005; C21D 6/04
See application file for complete search history.

(56) References Cited

U.S. PATENT DOCUMENTS 4,336,077 A * 6/1982 Leach ................ B23P 15/10
                                                29/888.044
5,174,122 A * 12/1992 Levine ................ C21D 1/62
                                                62/51.1
(Continued)

FOREIGN PATENT DOCUMENTS

CN    102492805       6/2012    ............ C21D 1/09
CN    102492805 A  * 6/2012
(Continued)

OTHER PUBLICATIONS

Machine Translation of CN-102492805 An, A method and device for strengthening metal materials by cryogenic laser shock, 2012 (Year: 2012).*
(Continued)

*Primary Examiner* — Brian W Jennison
*Assistant Examiner* — Abigail H Rhue (57) ABSTRACT

In a cryogenic workbench, a cryogenic laser peening system and a control method, a tapered surface gap d is adjusted, based on the electromagnetic principle, to control the gasification volume of liquid nitrogen, then the temperatures of the copious cooling workbench and the surface of a sample are precisely controlled by means of the adjustment of the heat absorption amount of liquid nitrogen gasification, the
(Continued)

temperature adjustment range and the temperature rising/lowering rate of the cryogenic laser peening system are effectively extended, and the precision of the control of the surface temperature of the sample is increased in combination with a closed-loop control. Additionally, an intelligent control of a cryogenic laser peening process is realized by means of a computer and a PLC control unit, whereby the usage amount of liquid nitrogen in the experiment process is reduced and the processing efficiency is improved.

10 Claims, 3 Drawing Sheets

(51) Int. Cl.
    *B23K 26/70*     (2014.01)
    *C21D 6/04*     (2006.01)
    *C21D 11/00*     (2006.01)
    *F25D 3/10*     (2006.01)
    *F25D 29/00*     (2006.01)
    *C22F 1/18*     (2006.01)

(52) U.S. Cl.
    CPC .............. *C21D 6/04* (2013.01); *C21D 11/005* (2013.01); *F25D 3/10* (2013.01); *F25D 29/001* (2013.01); *C22F 1/183* (2013.01)

(56) References Cited

U.S. PATENT DOCUMENTS

| | | | | |
|---|---|---|---|---|
| 10,745,776 B2* | 8/2020 | Zhou | ..................... | B23K 26/122 |
| 11,040,414 B2* | 6/2021 | Scott | ....................... | B23K 26/04 |
| 2002/0008087 A1* | 1/2002 | Clauer | ................. | C21D 10/005 |
| | | | | 219/121.84 |
| 2013/0180969 A1* | 7/2013 | Cheng | ................... | B23K 26/356 |
| | | | | 219/121.85 |

FOREIGN PATENT DOCUMENTS

| | | | | |
|---|---|---|---|---|
| CN | 102728950 | | 10/2012 | ............. B23K 26/18 |
| CN | 102732707 | | 10/2012 | ............... C21D 9/50 |
| CN | 102776521 | | 11/2012 | ............... C22F 1/18 |
| CN | 104263884 | A * | 1/2015 | |
| CN | 103409729 | B * | 11/2015 | |
| CN | 105063284 | | 11/2015 | ............... C21D 1/09 |
| CN | 105385839 | | 3/2016 | ............. C21D 10/00 |
| CN | 105385839 | A * | 3/2016 | |

OTHER PUBLICATIONS

Machine Translation of CN-105385839 Lu, A kind of laser shock strengthening automatic control system and method, 2016 (Year: 2016).*
Machine Translation of CN-103409729 Liu, A method for preparing diamond-like carbon film by strong laser irradiation, 2015 (Year: 2015).*
Machine Translation of CN-105385839 Han, Laser shock wave pressure confinement method and device based on air laminar flow. 2015 (Year: 2015).*
International Preliminary Report on Patentability (w/translation) issued in application No. PCT/CN2016/099513, dated Mar. 19, 2019 (9 pgs).
International Search Report and Written Opinion (w/translation) issued in application No. PCT/CN2016/099513, dated Jun. 6, 2017 (15 pgs).

* cited by examiner

CRYOGENIC WORKBENCH, CRYOGENIC LASER PEENING EXPERIMENT SYSTEM AND CONTROL METHOD THEREFOR

TECHNICAL FIELD

The present invention relates to the field of laser processing technology and the field of surface strengthening, and provides a cryogenic workbench, cryogenic laser shock strengthening experiment system and control method thereof, wherein the cryogenic laser shock strengthening experimental system utilizes electromagnetic suction force to adjust the conical surface gap to precisely control the volume of the liquid nitrogen gasification and the sample surface temperature.

TECHNICAL BACKGROUND

The cryogenic laser shock strengthening technology combines the multiple advantages of laser shock strengthening, high-energy, ultra-fast and ultra-low temperature deformation technology, which can induce a higher dislocation density to increase the hardness of the surface of the metal material significantly; and has broad application prospect in aerospace, marine engineering and transportation field and other fields. However, cryogenic laser shock strengthening technology has extremely high requirements on the temperature, and the optimal cryogenic temperature of different materials also has significant differences, which requires the cryogenic laser shock strengthening equipment has large temperature adjustment range and higher temperature control precision.

At present, liquid nitrogen is commonly used in cryogenic laser shock strengthening equipment as a cooling medium for refrigeration, such as the issued patent No. CN102492805B provides a method and a device for strengthening metal material by cryogenic laser shock; whereby the liquid nitrogen is used as a cooling medium for cooling the whole cryogenic treatment chamber as well as controlling the surface temperature of the sample by using the principle of heat conduction. Although this method can accomplish the cryogenic laser shock strengthening to a certain extent, there are still some shortcomings such as: 1. the cooling and heating rate is still slow due to the effect of the volume of the cryogenic treatment chamber; 2. the temperature distribution in the cryogenic treatment chamber is uneven and the response speed of the temperature regulation is slow, so the controlled precision of the surface temperature of the sample is not high, and the error is large; 3. the liquid nitrogen is used in a large amount and comes at a higher cost. The patent No. CN105063284A provides a high-light-transmittance cryogenic laser shock head and laser shock system suitable for cryogenic laser shock technology by immersing the sample in the liquid nitrogen to realize the ultra-low temperature, but the following disadvantages still exists: 1. the method and the device can only accomplish a single temperature, and cannot realize any temperature adjustment; 2. the controlled precision of the invention is closely related to the sample size, the volume of the cryogenic case and the room temperature, but the controlled temperature precision is not high; 3. the liquid nitrogen is used in a large amount, and it comes at a higher cost.

In order to improve the temperature adjustment range, the rising/lowering temperature response speed and the temperature control precision in the cryogenic laser shock strengthening equipment, the method of the present invention proposes a high precision temperature controlled cryogenic laser shock strengthening experimental system for cooling the cryogenic workbench and the sample by using the electromagnetic suction force to adjust the conical surface gap to precisely control the volume of liquid nitrogen gasification, and then precisely control the surface temperature of the sample by adjusting the heat absorption of liquid nitrogen gasification. Upon searching domestic and foreign literatures, no related device has been found to adjust the gap of the conical surface through electromagnetic suction force to control the temperature of the cryogenic workbench, and no related report has been found on the application of related method in the field of cryogenic laser shock. The present invention is the first to propose the device.

CONTENT OF THE INVENTION

The invention provides a cryogenic workbench with high precision temperature control, a cryogenic laser shock strengthening experimental system and a control method thereof; and it uses the electromagnetic suction force to adjust the conical surface gap to precisely control the volume of liquid nitrogen gasification; thereby, adjusting the heat absorption of the liquid nitrogen gasification to control the temperature of the sample surface precisely. Thus the invention can expand the temperature adjustment range over the prior art, the response speed, as well as the controlled precision of the temperature; and it is easy to operate and has high processing efficiency.

A cryogenic workbench is characterized in that mainly comprising a working table, an upper mounting plate, a lower mounting plate, a double head stud, a spring, an electromagnet and a baseplate. The conical groove is set on the lower surface of the working table. The conical projection is set on the surface of the upper mounting plate, which has a liquid nitrogen outlet penetrating through the upper mounting plate. The liquid nitrogen channel is set on the lower mounting plate. A through hole is set on the upper mounting plate and the lower mounting plate respectively. The working table, the upper mounting plate and the lower mounting plate are stacked from the top to the bottom sequentially. The number of the conical grooves is equal to the number of the conical projections, and the conical projections are located in the conical grooves. The liquid nitrogen channel can be connected to the liquid nitrogen outlet on the upper mounting plate. One end of the double head stud passes through the through hole of the upper mounting plate, and the through hole of the lower mounting plate to be in threaded connection with the working table. The other end of the double head stud is in threaded connection with the baseplate. The spring is mounted between the baseplate and the lower mounting plate, and is in a compressed condition. The electromagnet is fixed on the baseplate. The lower mounting plate is made of ferromagnetic material. The upper mounting plate is made of non-ferromagnetic material.

Furthermore, multiple conical grooves and conical projections are distributed on the working table and the upper mounting plate evenly.

Furthermore, the diameter of the liquid nitrogen outlet on the conical projections is between 0.5 to 1.2 mm.

Furthermore, the fasten screw nut is set on the end of the double head stud connected to the working table. The other end of the double head stud threaded connected to the baseplate is connected to the hexagon socket stud which is used to adjust the level of working table.

Furthermore, the convex plate is set on the lower surface of the lower mounting plate, and the spring is connected to the convex plate.

The cryogenic laser shock strengthening experimental system comprising the cryogenic workbench is characterized in that mainly comprising an outer shell, a laser, an optical path adjustment system, a cryogenic workbench, a two-axis motional platform, a temperature sensor, a liquid nitrogen tank, an automatic air-compressor, a PLC integrated control system and a whole control table. The outer shell is divided into a cryogenic treatment zone, an optical adjustment and a large equipment placement zone by an insulating layer. The laser, the liquid nitrogen tank, the automation air-compressor and the whole control table are placed in the large equipment placement zone. The laser is located at the top of the large equipment placement zone. The optical path adjustment system is installed in the optical adjustment zone, which comprises an optical adjustment rack, a total reflection mirror and a condenser lens. The total reflection mirror and the condenser lens are installed on the optical adjustment rack. Through holes sealed by optical glass are set in the insulating layers among the optical adjustment zone, the large equipment placement zone and the cryogenic treatment zone. The cryogenic workbench, the two-axis motional platform and the temperature sensor are set in the cryogenic treatment zone. The cryogenic workbench is fixed on the two-axis motional platform through a transfer table. The probe of the temperature sensor is located at the top of the working table of the cryogenic workbench, which is used to detect the temperature of the surface of the sample to be processed. The liquid nitrogen channel in the lower mounting plate of the cryogenic workbench is connected to the liquid nitrogen tank through the liquid nitrogen pipe line. The automatic air-compressor provides a pressure source for the liquid nitrogen tank through the high-pressure gas pipe and the joint.

The laser, the automatic air-compressor, the two-axis motional platform, the temperature sensor and the electromagnet are connected to the PLC integrated control system and the computer of the whole control table. The laser process parameter, the path of motion and the pressure of the liquid nitrogen tank are controlled by the computer of the whole control table through the PLC integrated control system. According to the difference between the temperature of the workpiece surface detected by the temperature sensor and the predetermined temperature, the PLC integrated control system controls the current of the electromagnet, and then adjusting the gap d between the conical groove and the conical projection, adjusting the liquid nitrogen gasification rate and realizing precision control on the workpiece temperature.

Furthermore, a dehumidifier is set in the optical adjustment zone and the cryogenic treatment zone, respectively, whereby the working state of the dehumidifier is controlled by the computer of the whole control table through the PLC integrated control system.

Furthermore, a tool allocation room is included, a single-axis motional platform is set in the tool allocation room, the working state of the single-axis motional platform is controlled by the computer of the whole control table through the PLC integrated control system. An automatic door is disposed between the tool allocation room and the cryogenic treatment zone.

A control method of the cryogenic laser shock strengthening experimental system comprises the following steps:

(1) Turn on the power of the whole control table, start the computer, start the PLC integrated control system, start the security door of the tool allocation room and then mount sample, absorption layer, constraint layer and temperature sensor;

(2) Set the laser energy, the predetermined temperature of the sample, the pressure of the liquid nitrogen tank and the predetermined humidity between the optical adjustment zone and the cryogenic treatment zone on the computer and compile the motion track of the two-axis motional platform.

(3) Run the computer setup program, the two-axis motional platform and the single-axis motional platform automatically cooperate to transport the cryogenic workbench and the sample to the designated position of the cryogenic treatment zone. And then start the dehumidifiers in the optical adjustment zone and the cryogenic treatment zone, the PLC integrated control system collects the temperature of the workpiece surface detected by the temperature sensor at real-time. And control the current in the electromagnet according to the difference between the actual temperature and the predetermined temperature, which makes the upper mounting plate move down to form a gap in the distance of d between the conical groove and the conical projection, the liquid nitrogen enters into the gap and gasification will carry away the heat of the working table to accomplish cooling of the working table and the sample. When the temperature of the sample approaches or falls below the predetermined temperature, the computer will control the PLC integrated control system to reduce the current in the electromagnet, which makes the upper mounting plate move up to reduce the gap d between the conical groove and the conical projection to reduce the volume of the liquid nitrogen gasification in unit time; as a result, the cryogenic workbench enters into a state of heating preservation or heating up.

(4) When the humidity between the optical adjustment zone and the cryogenic treatment zone as well as the liquid nitrogen tank pressure and the sample temperature satisfy the setup condition, the laser 1 starts, the two-axis motional platform will move as the set track to accomplish the cryogenic laser shock strengthening.

(5) After the strengthening is finished, the two-axis motional platform and the single-axis motional platform automatically cooperate to transport the cryogenic workbench and the sample into tool allocation room, being ready to execute the next step.

Furthermore, the laser plus width is 8 to 100 ns, the set humidity of the optical adjustment zone is 20 to 25%, the set humidity of the cryogenic treatment zone is 10 to 15%. The air-compressor can keep the pressure of the liquid nitrogen tank 20 between 30 to 50 MPa. The temperature range of the workpiece surface is −20 to −179□, the error is ±8 □.

The work process of the cryogenic workbench is as follows: when the system is out of work, the conical projection on the upper mounting plate is closely matched with the conical groove in the working table, the liquid nitrogen cannot pass the gap of the conical surface to be gasified for refrigeration. When the system is turned on, the PLC integrated control system is controlled by the computer to collect the temperature of sample surface, which is fed by temperature sensor at real time. And control the current in the electromagnet according to the difference between the actual temperature and the predetermined temperature, which makes the upper mounting plate move down to form a gap between the conical groove and the conical projection, the liquid nitrogen enters into the gap and gasification will carry away the heat of the working table to accomplish cooling the working table and the sample. While the temperature of the sample approaches or falls below the predetermined temperature, the computer will control the PLC integrated control system to reduce the current in the electromagnet, and then the upper mounting plate moves up to reduce the gap d between the conical groove and the conical projection to reduce the volume of the liquid nitrogen gasification in unit time, which allows the cryogenic workbench to enter the state of temperature preservation or heating up. The method can enlarge the range of the temperature adjustment efficiently and reduce the amount of the liquid nitrogen used at meantime, and improves the controlled precision of temperature of the sample surface in combination with the closed-loop control. The temperature control range of the cryogenic workbench is between −20 to −179° C. for common metal materials such as aluminum alloy, steel and titanium alloy; and the temperature error is ±8° C. The highest adjustment precision of the present invention can reach ±3° C.

The beneficial effects of the invention:
1. A method of adjusting the gap of the conical surface in electromagnet principles for adjusting the temperature of the cryogenic workbench, and the temperature adjustment of the metal material can reach −20 to −179° C., which can enlarge the temperature adjustment range of the traditional cryogenic laser shock strengthening device.
2. The cryogenic workbench and the sample are cooled directly, the heating/cooling speed is faster, and the response speed to the temperature adjustment is faster.
3. The combination with closed-loop can improve the controlled precision of temperature efficiently at ultra-low temperature environment, and the highest precision can reach ±3° C.
4. The intelligent control of the laser energy, the sample temperature, the liquid nitrogen pressure, the humidity and the movement track is realized, the operation is simple and the efficient of processing is extremely high.
5. The liquid nitrogen used is less, the costs of the processing are reduced.

1. laser, 2. vertical gland, 3. first optical glass, 4. optical adjustment rack, 5. total reflection mirror, 6. condenser lens, 7. first dehumidifier, 8. second optical glass, 9. horizontal gland, 10. constraint layer, 11. absorption layer, 12. sample, 13. temperature sensor, 14. cryogenic workbench, 15. flexible liquid nitrogen pipeline, 16. Insulating layer, 17. the transfer joint, 18. liquid nitrogen pipeline, 19. first joint, 20. liquid nitrogen tank, 21. second joint, 22. transfer table, 23. two-axis motional platform, 24. automatic door, 25. single-axis motional platform, 26. security door, 27. second dehumidifier, 28. high-pressure gas pipe, 29. automatic air-compressor, 30. PLC integrated control system, 31. computer, 32. whole control table, 33. outer shell; 14-1. the working table, 14-2. fasten screw nut, 14-3. upper mounting plate, 14-4. lower mounting plate, 14-5. double head stud, 14-6. spring, 14-7. electromagnet, 14-9. stud, 14-10. fasten screw nut, 14-11. hexagon socket studs, 14-12. baseplate, 14-13. hexagon socket studs.

EMBODIMENTS

A further explanation of the invention is given with reference to the drawing and the embodiment. However, the protection scope of the present invention is not limited in here.

Figure 1:
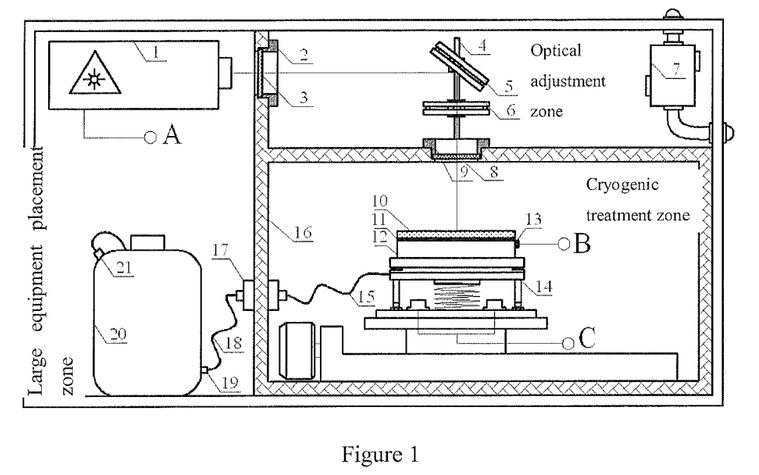
FIG. 1 is the right view of the cryogenic laser shock strengthening system according to the present invention.
Figure 2:
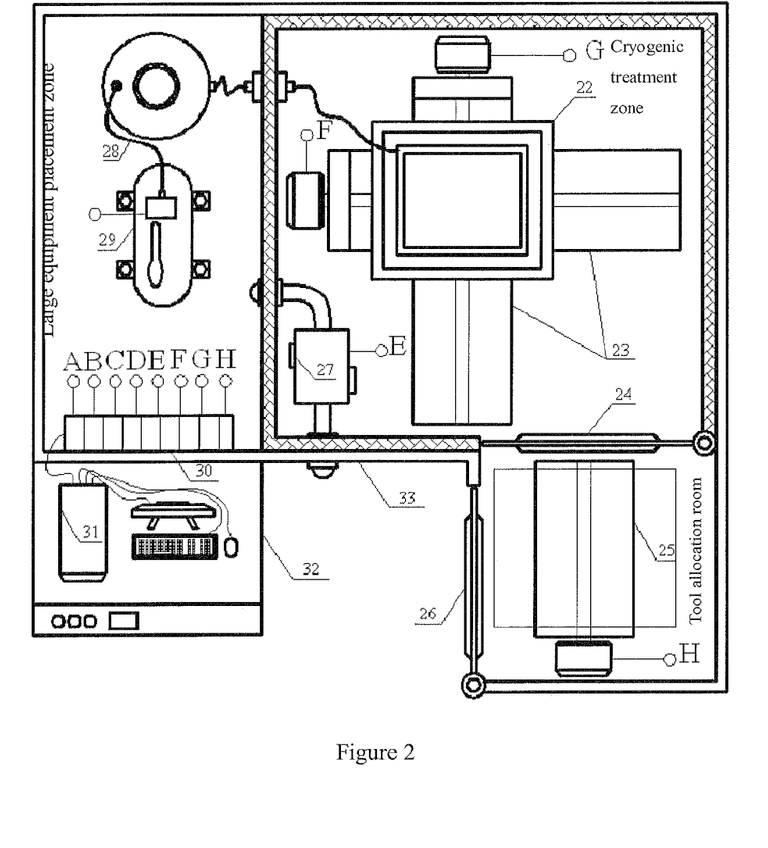
FIG. 2 is the top view of the cryogenic laser shock strengthening system according to the present invention.

As shown in the FIGS. 1 and 2, the cryogenic laser shock strengthening system of the invention mainly comprises an outer shell 33, a laser 1, an optical adjustment system, a cryogenic workbench 14, a two-axis motional platform 23, a temperature sensor, a liquid nitrogen tank, an automatic air-compressor 29, a PLC integrated control system 30 and a whole control table 32. The outer shell 33 is divided into a cryogenic treatment zone, an optical adjustment zone and a large equipment placement zone by the insulating layer 16. The laser 1, the liquid nitrogen tank, the automatic air-compressor 29 and the whole control table 32 are placed in the large equipment placement zone. The laser 1 is located on top of the large equipment placement zone. The optical path adjustment system is installed in the optical adjustment zone, which comprises an optical adjustment rack 4, a total reflection mirror 5 and a condenser lens 6. The total reflection mirror 5 and the condenser lens 6 are installed on the optical adjustment rack 4. Through holes sealed by optical glass are set on the insulating layers 16 among the optical adjustment zone and the large equipment placement zone and the cryogenic treatment zone. The first optical glass 3 between the optical adjustment zone and the large equipment placement zone is pressed against the insulating layer 16 by the vertical gland 2. The second optical glass 8 between the optical adjustment zone and the cryogenic treatment zone is pressed against the insulating layer 16 by the horizontal gland 9. The laser beam emitted by the laser 1 enters the optical adjustment zone through the first optical glass 3, and then the laser enters the cryogenic treatment zone through the 45° total reflection mirror 5, the condenser lens 6 and the second optical glass 8. In order to reduce the influence of the water in the air on the optical properties of the total reflection mirror 5, the condenser lens 6 and the first optical glass 3, the optical adjustment zone uses the first dehumidifier 7 to keep dry.

The cryogenic workbench 14, the two-axis motional platform and the temperature sensor 13 are installed in the cryogenic treatment zone, the cryogenic workbench 14 is fixed on the two-axis motional platform through the transfer table 22.

Figure 3:
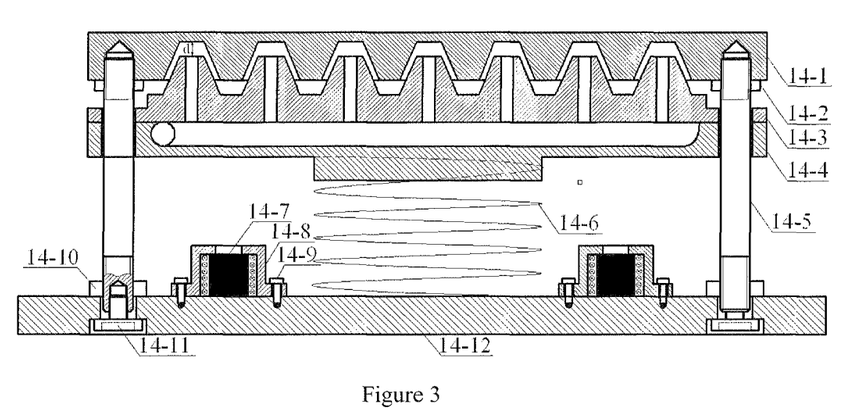
FIG. 3 is the assembly drawing of the cryogenic workbench.
Figure 4:
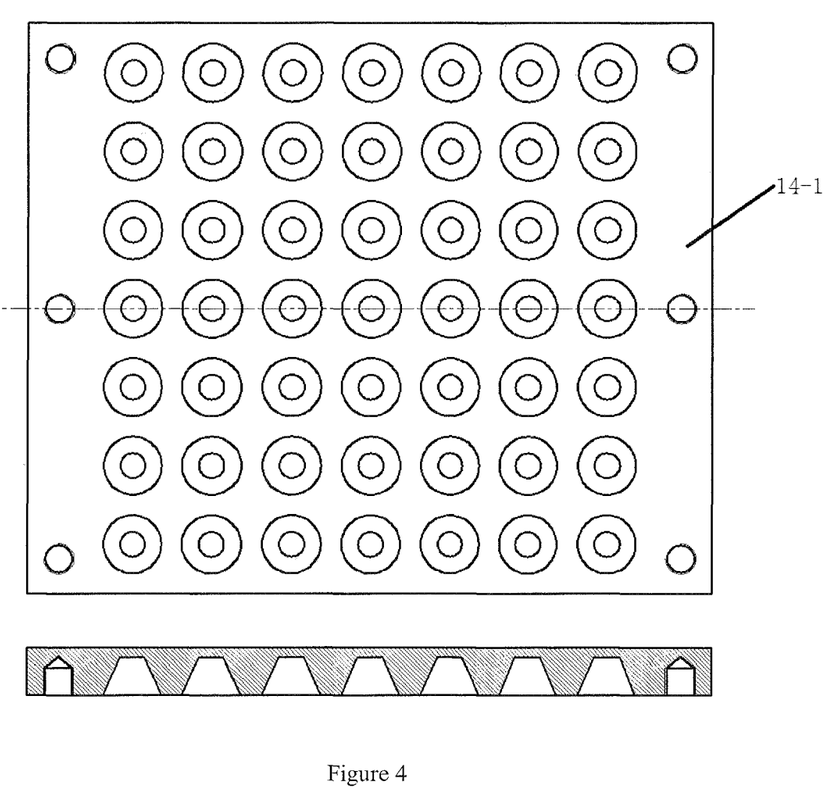
FIG. 4 is the drawing of the parts of the upper mounting plate.
Figure 5:
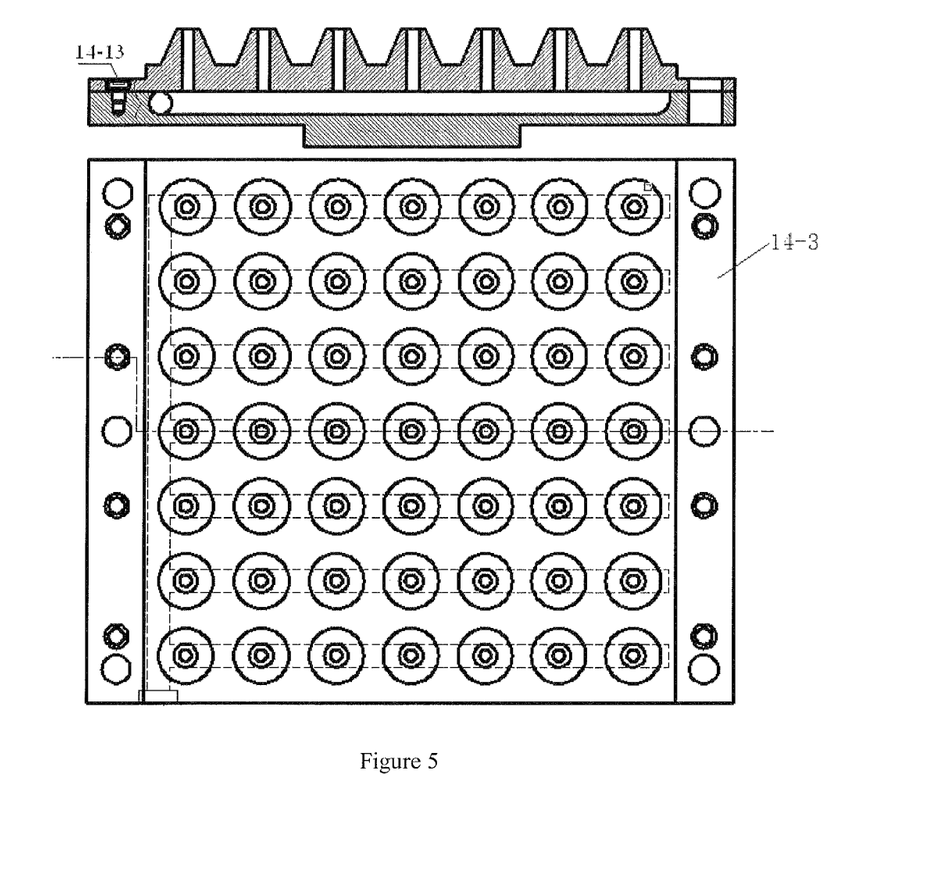
FIG. 5 is the assembly drawing of the lower mounting plate.

As shown in the FIG. 3, the cryogenic workbench 14 mainly comprises a working table 14-1, an upper mounting plate 14-3, a lower mounting plate 14-4, a double head stud 14-5, a spring 14-6, an electromagnet 14-7, and a baseplate 14-12. The conical groove is set on the lower surface of the working table 14-1. The conical projection is set on the surface of the upper mounting plate 14-3, and a liquid nitrogen outlet penetrating through the upper mounting plate 14-3 is set on the conical projection. The diameter of the liquid nitrogen outlet on the conical projections is between 0.5 to 1.2 mm. The liquid nitrogen channel is set on the lower mounting plate 14-4. Through holes are set on the upper mounting plate 14-3 and the lower mounting plate 14-4 respectively. The working table 14-1, the upper mounting plate 14-3 and the lower mounting plate 14-4 are sequentially stacked from top to the bottom. The number of the conical grooves is equal to the number of the conical projections, whereby the conical projections are located in the conical grooves. The number of the Multiple conical grooves and conical projections are evenly distributed on the working table 14-1 and the upper mounting plate 14-3. The liquid nitrogen channel can be connected to the liquid nitrogen outlet on the upper mounting plate. One end of the double head stud 14-5 passes through the through holes of the upper mounting plate and the lower mounting plate, and then is in threaded connection with the working table 14-1. The other end of the double head stud is in threaded connection with the baseplate 14-12. The end of the double head stud connected to the workbench 14-1 has a fasten screw nut on it. The other end of the double head stud in threaded connection with the baseplate 14-12 is also connected to the hexagon socket studs 14-11, and the hexagon socket studs 14-11 are used to adjust the level of the workbench 14-1. The spring 14-6 is installed between the baseplate 14-12 and the lower mounting plate 14-4, and is in the compression condition. The convex plate is set on the lower surface of the lower mounting plate 14-4, and the spring 14-6 is connected to the convex plate. The electromagnet 14-7 is fixed on the baseplate 14-12. The lower mounting plate 14-4 is made of ferromagnetic material. The upper mounting plate 14-3 is made of non-ferromagnetic material.

The sample 12 coated with absorption layer 11 is installed on the cryogenic workbench 14, the sapphire glass is used as the constraint layer (10) above the absorption layer 11, the probe of the temperature sensor 13 is located at the upper part of working table of the cryogenic workbench, which is used to detect the temperature of the sample surface. The temperature sensor 13 is attached to the side of the sample 12, and feeding back to the PLC integrated control system 30 through joint B to realize closed-loop control of the temperature. The liquid nitrogen channel on the lower mounting plate 14-4 of the cryogenic working table 14 is connected to the liquid nitrogen tank through liquid nitrogen pipeline 18. The automatic air-compressor 29 provides a source of the pressure power for the liquid nitrogen tank 20 through the high-pressure gas pipe 28 and the second joint 21. In order to finish controlling of the temperature, the automatic air-compressor 29 provides a source of the pressure power for the liquid nitrogen tank 20 through the high-pressure gas pipe 28 and the second joint 21. Under the influence of the pressure, the liquid nitrogen goes into the cryogenic treatment zone through the first joint 19, liquid nitrogen pipeline 18 and the transfer joint 17, which is connected to the cryogenic workbench 14 through the flexible liquid nitrogen pipeline 15.

The laser 1, the automatic air-compressor 29, the two-axis motional platform, the temperature sensor 13, the electromagnet are connected to the PLC integrated control system 30 and the computer 31 of the whole control table 32. The computer 31 of the whole control table 32 is used to control the laser process parameter, the path of motion and the pressure of the liquid nitrogen tank 20 through the PLC integrated control system 30. And control the current of the electromagnet according to the difference between the temperature of the workpiece surface detected by the temperature sensor 13 and the predetermined temperature through the PLC integrated control system 30, and then adjusting the gap d between the conical groove and the conical projection, adjusting the liquid nitrogen gasification rate to realize the precise control of the surface temperature of the workpiece, which improves the processing efficiency greatly.

In order to avoid the influence of the water in the air on the optical properties of the second optical glass 8 and the constraint layer 10, the cryogenic treatment uses the second dehumidifier 27 to keep dry. The working state of the first dehumidifier 7 and the second dehumidifier 27 are controlled by the computer 31 of the whole control table 32 through the PLC integrated control system 30.

In order to install and disassemble the sample conveniently, the single-axis motional platform 25 is set in the tool allocation room to realize the movement of the cryogenic workbench 14, the working state of the single-axis motional platform 25 is controlled by the computer 31 of the whole control table 32 through the PLC integrated control system 30. The automatic door 24 is disposed between the tool allocation room and the cryogenic treatment zone to ensure that the cryogenic treatment zone has a certain sealing property. At the same time the security door 26 is disposed on the side of the tool allocation room to facilitate manual installation and debugging.

The principle of the cryogenic workbench 14 is: adjusting the gap of the conical surface by the electromagnet suction force to control the volume of the liquid nitrogen gasification precisely, and then adjusting the heat absorption of the liquid nitrogen gasification to control the temperature of the sample surface precisely. The specific process is as follows: when the system is out of work, the conical projection on the upper mounting plate 14-3 is closely matched with the conical groove in the working table 14-1, the liquid nitrogen cannot pass through the gap of the conical surface to be gasified for refrigeration. When the system is turned on, the PLC integrated control system 30 is controlled by the computer 31 to collect the temperature of sample 12 surface, which is fed by temperature sensor 13 at real time. And control the current in the electromagnet 14-7 according to the difference between the actual temperature and the predetermined temperature, makes the upper mounting plate 14-3 move down to form a gap in a distance of d between the conical groove and the conical projection, the liquid nitrogen enters into the gap and gasification will carry away the heat of the working table to accomplish cooling of the working table 14-1 and the sample 12. While the temperature of the sample 12 approaches or falls below the predetermined temperature, the computer 31 will control the PLC integrated control system 30 to reduce the current in the electromagnet 14-7, and then the upper mounting plate 14-3 moves up to reduce the gap d between the conical groove and the conical projection to reduce the volume of the liquid nitrogen gasification in unit time, which allows the cryogenic workbench 14 to enter the state of temperature preservation or heating up. The method can enlarge the range of the temperature adjustment, heating/cooling rate efficiently and reduce the use of the liquid nitrogen at the same time, as well as in combination with closed-loop controls to improve the control precision of the temperature of the sample surface.

The control method of the cryogenic laser shock strengthening system, comprises the following steps:

(1) Turn on the power of the whole control table 32, start the computer 31, start the PLC integrated control system 30, start the security door 26 of the tool allocation room and then mount sample 12, absorption layer 11, constraint layer 10 and temperature sensor 13;

(2) Set the energy of laser 1, the predetermined temperature of the sample 12, the pressure of the liquid nitrogen tank 20 and the predetermined humidity in the optical adjustment zone and the cryogenic treatment zone on the computer 31, and compile the motional track of the two-axis motional platform 23;

(3) Run the computer 31 setup program, the two-axis motional platform 23 and the single-axis motional platform 25 automatically cooperate to transport the cryogenic workbench 14 and the sample 12 to the designated position of the cryogenic treatment zone. And then start the dehumidifier in the optical adjustment zone and the cryogenic treatment zone, the PLC integrated control system 30 collects the temperature of the workpiece surface detected by the temperature sensor 13 at real-time. And control the current in the electromagnet 14-7 according to the difference between the actual temperature and the predetermined temperature, which makes the upper mounting plate 14-3 move down to form a gap in the distance of d between the conical groove and the conical projection, the liquid nitrogen enters the gap and gasification will carry away the heat of the working table to accomplish cooling of the working table 14-1 and the sample 12. While the temperature of the sample 12 approaches or falls below the predetermined temperature, the PLC integrated control system 30 is controlled by the computer 31 to reduce the current in the electromagnet 14-7, which makes the upper mounting plate 14-3 move up to reduce the gap d between the conical groove and the conical projection to reduce the volume of the liquid nitrogen gasification in unit time, as a result, the cryogenic workbench 14 enters the state of heating preservation or heating up.

(4) When the humidity in the optical adjustment zone and the cryogenic treatment zone as well as the liquid nitrogen tank pressure 20 and the temperature of sample 12 satisfy the setup condition, the laser 1 starts, the two-axis motional platform 23 moves as the set track to accomplish the cryogenic laser shock strengthening;

(5) After the completion of the strengthening, the two-axis motion platform 23 and the single-axis motion platform 25 automatically cooperate to transport the cryogenic workbench 14 and the sample 12 to the tool allocation room, and prepare to execute the next procedure.

Furthermore, the plus width of laser 1 is 8 to 100 ns, the set humidity of the optical adjustment zone is 20 to 25%, the set humidity of the cryogenic treatment zone is 10 to 15%. The air-compressor 29 keeps the pressure of the liquid nitrogen tank 20 between 30 to 50 MPa. The temperature scope of the cryogenic workbench 14 reaches −20 to −179° C. for the temperature of workpiece surface of common metal materials such as aluminum alloy, steel and titanium alloy. The temperature error is 18° C., and the highest adjustment precision of the invention can reach ±3° C.

The cryogenic laser shock strengthening experiment of 2024 aerial aluminum alloys is conducted by the cryogenic laser shock strengthening experimental system of the present invention. The size of the 2024 aerial aluminum alloys is 40 mm×40 mm×2 mm Nd:YAG nanosecond laser 1 is used as the laser 1, the plus width is 10 ns, the absorption layer is black paint, the average thickness is 200 μm. The constraint layer material is sapphire glass of 3 mm thickness. The set humidity of the dehumidifier 7 is 22±2%, the set humidity of the dehumidifier 27 is 13±0.5%, the pressure of the liquid nitrogen tank 20 is 40±2 MPa. The lower mounting plate 14-4 of the cryogenic workbench 14 is made of 45# steel, the upper mounting plate is made of 7075 aerial aluminum and its thickness is 10 mm. The diameter of the through hole of the conical projection in the upper mounting plate 14-3 is 1 mm.

The experimental result shows that when the temperature error is within ±8° C., the controlled temperature range of the cryogenic workbench 13 to the 2024 aerial aluminum reaches −16 to −182° C. When the temperature error is within ±3° C., the controlled temperature range of the cryogenic workbench 13 to the 2024 aerial aluminum reaches −58 to −137° C. The above results show that the device of the present invention can expand the controlled temperature range of the cryogenic laser shock strengthening, improve the control precision of the temperature significantly as well as satisfy the experimental requirement of the cryogenic laser shock strengthening.

The above embodiments are the preferred embodiments of the present invention, but the present invention is not limited to the above embodiments. Without departing from the substance of the present invention, any obvious improvement, substitution or modification that can be made by a person skilled in the art belong to the protection scope of the present invention.

What is claimed is:

1. A cryogenic workbench comprising a working table, an upper mounting plate, a lower mounting plate, a double head stud, a spring, an electromagnet and a baseplate, wherein a conical groove is set on a lower surface of the working table, a conical projection is set on an upper surface of the upper mounting plate, a liquid nitrogen outlet penetrating through the upper mounting plate is set on the conical projection, a liquid nitrogen channel is set on the lower mounting plate, through holes are set on the upper mounting plate and the lower mounting plate respectively; the working table, the upper mounting plate and the lower mounting plate are stacked from the top to the bottom sequentially, wherein the number of the conical grooves is equal to the number of the conical projections, the conical projections are located in the conical grooves, and the liquid nitrogen channel is connectable to the liquid nitrogen outlet on the upper mounting plate; one end of the double head stud passes through the through holes of the upper mounting plate and the lower mounting plate and is in threaded connection with the working table, wherein the other end of the double head stud is threaded connected with the baseplate, the spring is installed between the baseplate and the lower mounting plate and is in the compression condition, and the electromagnet is fixed on the baseplate; the lower mounting plate is made of ferromagnetic material, and the upper mounting plate is made of non-ferromagnetic material.

2. The cryogenic workbench according to claim 1, wherein a plurality of the conical grooves and a plurality of the conical projections are evenly distributed on the working table and the upper mounting plate respectively.

3. The cryogenic workbench according to claim 1, wherein a diameter of the liquid nitrogen outlet on the conical projections is within a range of 0.5 to 1.2 mm.

4. The cryogenic workbench according to claim 1, wherein a fasten screw nut is set on the end of the double head stud that is connected to the workbench, the other end of the double head stud is in threaded connection with the baseplate and also connected to hexagon socket studs that is used to adjust a level of workbench.

5. The cryogenic workbench according to claim 1, wherein a convex plate is set on a lower surface of the lower mounting plate, and the spring is connected to the convex plate.

6. A cryogenic laser shock strengthening experimental system comprising the cryogenic workbench according to claim 1, comprising an outer shell, a laser, an optical path adjustment system, a cryogenic workbench, a two-axis motional platform, a temperature sensor, a liquid nitrogen tank, an automatic air-compressor, a PLC integrated control system and a whole control table, wherein the outer shell is divided into a cryogenic treatment zone, an optical adjustment and a large equipment placement zone by insulating layers, the laser, the liquid nitrogen tank, the automatic air-compressor and the whole control table are placed in the large equipment placement zone, and the laser is located at a top of the large equipment placement zone; wherein the optical path adjustment system is installed in the optical adjustment zone and comprises an optical adjustment rack, a total reflection mirror and a condenser lens, the total reflection mirror and the condenser lens are installed on the optical adjustment rack; wherein through holes sealed by optical glass are set in the insulating layers among the optical adjustment zone; wherein the large equipment placement zone and the cryogenic treatment zone, the cryogenic workbench, the two-axis motional platform and the temperature sensor are set in the cryogenic treatment zone; wherein the cryogenic workbench is fixed on the two-axis motional platform through a transfer table, and a probe of the temperature sensor is located at a top of the working table of the cryogenic workbench, which is used to detect a temperature of a sample surface to be processed; wherein the liquid nitrogen channel in the lower mounting plate of the cryogenic workbench is connected to the liquid nitrogen tank through a flexible liquid nitrogen pipeline, and the automatic air-compressor provides a pressure source for the liquid nitrogen tank through a high-pressure gas pipe and a joint; and the laser, the automatic air-compressor, the two-axis motional platform, the temperature sensor and the electromagnet are connected to the PLC integrated control system and a computer of the whole control table, wherein a laser processing parameter, a path of motion and a pressure of the liquid nitrogen tank are controlled by the computer of the whole control table through the PLC integrated control system, and a current of the electromagnet is controlled through the PLC integrated control system according to the difference between a temperature of the workpiece surface detected by the temperature sensor and the predetermined temperature, and then a gap d between each of the conical grooves and each of the conical projections is adjusted, and gasification rate of the liquid nitrogen is adjusted to achieve precision control to the temperature of the workpiece surface.

7. The cryogenic laser shock strengthening experimental system according to claim 6, wherein dehumidifiers are installed in the optical adjustment zone and the cryogenic treatment zone, and working states of the dehumidifiers are controlled by the computer of the whole control table through the PLC integrated control system.

8. The cryogenic laser shock strengthening experimental system according to claim 6, further comprising a tool allocation room, and a single-axis motional platform is set in the tool allocation room, and a working state of the single-axis motional platform is controlled by the computer of the whole control table through the PLC integrated control system, an automatic door is disposed between the tool allocation room and the cryogenic treatment zone.

9. A method for controlling the cryogenic laser shock strengthening experimental system, comprising the following steps:

(1) turning on a power of a whole control table, starting a computer and a PLC integrated control system, starting a security door of a tool allocation room and then mounting a sample, an absorption layer, a constraint layer and a temperature sensor;

(2) setting an energy of a laser, a predetermined temperature of the sample, a pressure of a liquid nitrogen tank and a predetermined humidity in an optical adjustment zone and a predetermined humidity of a cryogenic treatment zone on the computer, and compiling a set motion track of a two-axis motional platform;

(3) running a computer setup program, the two-axis motional platform and a single-axis motional platform automatically cooperate to transport a cryogenic workbench and the sample to a designated position of the cryogenic treatment zone, and then starting a dehumidifier in the optical adjustment zone and the cryogenic treatment zone, wherein the PLC integrated control system collects a temperature of the workpiece surface detected by the temperature sensor at real-time, a current in an electromagnet is controlled according to the difference between an actual temperature and the predetermined temperature, which makes an upper mounting plate move down to form a gap in distance of d between a conical groove and a conical projection, liquid nitrogen enters in the gap and gasification will carry away heat of a working table to accomplish cooling of the working table and the sample, a temperature of the sample approaches or falls below the predetermined temperature, the PLC integrated control system is controlled by the computer to reduce the current in the electromagnet, which makes the upper mounting plate move up to reduce the gap d between the conical groove and the conical projection to reduce a volume of liquid nitrogen gasification in unit time, and the cryogenic workbench enters into temperature preservation state or heating up state;

(4) when a humidity in the optical adjustment zone and the cryogenic treatment zone, the liquid nitrogen tank pressure and the sample temperature satisfy a setup condition, the laser starts, the two-axis motional platform moves along the set motion track to accomplish a cryogenic laser shock strengthening; and (5) when the cryogenic laser shock strengthening is complete, the two-axis motion platform and the single-axis motion platform automatically cooperate to transport the cryogenic workbench and the sample to a tool allocation room, ready to execute a next procedure.

10. The method for controlling the cryogenic laser shock strengthening experimental system according to claim 9, wherein a laser pulse width is 8 to 100 ns, the predetermined humidity of the optical adjustment zone is 20 to 25%, the predetermined humidity of the cryogenic treatment zone is 10 to 15%, an air-compressor keeps the pressure of the liquid nitrogen tank within 30 to 50 MPa, a temperature range of the workpiece surface reaches −20 to −179° C., and error of the temperature range of the workpiece surface is ±8° C.

* * * * *